(12) United States Patent
McCain et al.

(10) Patent No.: US 11,977,694 B2
(45) Date of Patent: May 7, 2024

(54) REMOTE POINTING DEVICE

(71) Applicants: Steven Quinn McCain, Littlefield, TX (US); Luis Carlos Urteaga, San Angelo, TX (US); Miguel Angel Muraira, Brownsville, TX (US); Micah Glenn Pratt, Littlefield, TX (US); Billy Glenn Tiller, Sudan, TX (US)

(72) Inventors: Steven Quinn McCain, Littlefield, TX (US); Luis Carlos Urteaga, San Angelo, TX (US); Miguel Angel Muraira, Brownsville, TX (US); Micah Glenn Pratt, Littlefield, TX (US); Billy Glenn Tiller, Sudan, TX (US)

(*) Notice: Subject to any disclaimer, the term of this patent is extended or adjusted under 35 U.S.C. 154(b) by 0 days.

(21) Appl. No.: 17/376,091

(22) Filed: Jul. 14, 2021

(65) Prior Publication Data

US 2022/0019296 A1    Jan. 20, 2022

Related U.S. Application Data

(60) Provisional application No. 63/051,865, filed on Jul. 14, 2020.

(51) Int. Cl.
| | |
|---|---|
| G06F 3/038 | (2013.01) |
| G06F 3/0354 | (2013.01) |
| G06F 3/16 | (2006.01) |
| H04N 7/15 | (2006.01) |
| H04N 7/18 | (2006.01) |
| H04N 9/31 | (2006.01) |

(52) U.S. Cl.
CPC ........ *G06F 3/0386* (2013.01); *G06F 3/03542* (2013.01); *G06F 3/16* (2013.01); *H04N 7/15* (2013.01); *H04N 7/185* (2013.01); *H04N 9/3176* (2013.01); *G06F 2203/0381* (2013.01); *G06F 2203/0383* (2013.01)

(58) Field of Classification Search
CPC ...................................... G06F 3/0386
USPC ...................................... 348/39, 143
See application file for complete search history.

(56) References Cited

U.S. PATENT DOCUMENTS

| | | | | |
|---|---|---|---|---|
| 9,591,336 | B2* | 3/2017 | Cronin | H04N 21/2187 |
| 2003/0042303 | A1* | 3/2003 | Tsikos | G06K 7/10594 |
| | | | | 235/384 |
| 2005/0093713 | A1* | 5/2005 | Orme | G03B 35/14 |
| | | | | 340/815.4 |
| 2018/0259123 | A1* | 9/2018 | Shim | F16M 11/205 |
| 2019/0311604 | A1* | 10/2019 | Morehouse | G08B 13/19613 |
| 2019/0385322 | A1* | 12/2019 | Gu | B64C 39/024 |

* cited by examiner

*Primary Examiner* — Calvin C Ma
(74) *Attorney, Agent, or Firm* — Spencer C. Patterson; Grable Fulton PLLC

(57) ABSTRACT

A method, system, and apparatus, including a program encoded on computer-readable medium, for providing remote control of a light beam pointing device. The system includes a camera that captures at least one image at a first location and a light source that generates a light beam in a direction within a viewable area of the camera. At a second location, remote from the first location, a display screen displays images captured by the camera and a controller that controls pointing of the light source toward a desired target object at the first location.

20 Claims, 2 Drawing Sheets

First Location ⬉ 215

Second Location ⬉ 230

REMOTE POINTING DEVICE

RELATED APPLICATION

This application claims the benefit of U.S. Provisional Application No. 63/051,865 filed Jul. 14, 2020, which is incorporated herein by reference in its entirety.

BACKGROUND

This description relates to telecommunications, and more particularly to a remote pointing device.

SUMMARY

Various software, Internet, electronic and other tools exist that enable the physical world to be viewed from a remote location. These tools can be used to facilitate improved telecommunications by, for example, enabling video conferencing, sharing of real-time images, and the like. By introducing a remote-controlled light, laser, or other visible pointer device that is "piggy-backed on" or coupled with the ability to view that same remote location (using a camera that is either stationary or has the ability to move by remote or local control), a greater degree of interactivity and clarity of communication can be accomplished. For example, a remote-controlled laser pointer can be combined with a camera to enable a viewer at a location remote from the camera to view images or video transmitted from the camera to the viewer's location and to also control the direction and/or illumination status of the laser pointer. Using such a system, the viewer can communicate information to persons at the location of the camera by selectively illuminating the pointer or directing the pointer such that an emitted laser "points" at, or illuminates, an object or location in the vicinity of the camera. Instead of having to verbally describe a location (e.g., on a person's body, a component on a piece of equipment, or a location on a surface), the viewer can control the remote-controlled laser pointer to cause a particular point or area (i.e., at, near, or in the vicinity of the location) to be illuminated. Such an ability to visually communicate information can reduce or eliminate potential confusion and can greatly increase the efficiency of communications between remote participants in a video conference or other telecommunication scenario.

DESCRIPTION OF DRAWINGS

Like reference symbols in the various drawings indicate like elements.

DETAILED DESCRIPTION

Figure 1:
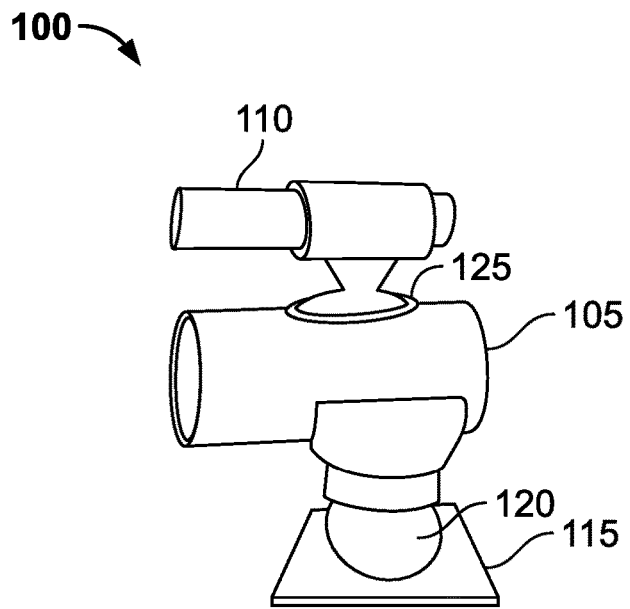
FIG. 1 is an example implementation of a camera with an attached light or laser pointing device.

In accordance with aspects described in this specification, a light, laser, or other pointing device at a particular location can be controlled from a remote location to enable improved clarity of communication with one or more individuals co-located with the pointing device. Communications, including audio and/or video, can be transmitted between the locations. The location of either end of this transmission can be virtually anywhere (e.g., outer space, underwater, underground, airspace, across a property, city, country, or globe, or any place a telecommunications signal can reach). The pointing device may be paired with or built into a fixed or moveable camera (that captures video or still images), which can enable a remote user at the remote location to view objects at the location of the camera. In general, the pointing device projects a laser or other light that is visible to the co-located individual. The location of where the laser or other light projects on a surface may also be visible to the remote user, either as a result of the light being visible on the surface in images or video captured by the camera and transmitted to a display screen associated with, or otherwise viewable by, the remote user, or as a result of a representation of the light being generated on the display screen (e.g., using a digital overlay on the received images). The direction of the light may be fixed relative to the camera, such that movement of the camera causes the light to be projected in a fixed direction relative to the camera field of view (e.g., in the center of the camera field of view). Alternatively, the direction of the light may be moveable relative to the direction of the camera (e.g., using a one-, two-, or three-axis gimbal).

Throughout this description, either endpoint (or both endpoints) of the communication may be considered the remote location, while the other location may be described as a first, primary, camera, or near location (simply to use terminology that distinguishes the location). In general, what is termed "the remote location" can change depending on the context (e.g., the camera is remote from a distant viewer, and the viewing and controlling location or device may be remote from the camera). In some cases, a first location may be where the camera and pointing device are located, and the remote location may be anywhere to which audio, images, video, and/or other communications are transmitted from the first location. In other words, the remote location may be remote from the source of information. In other situations, the remote location may instead be the location from which information is transmitted. In other words, it is remote from the viewer and/or the person who is controlling or directing the pointing device. In other situations, both locations may be considered remote in the sense that they are remote from one another. Similarly, both locations may simultaneously, asynchronously, or alternately transmit audio, video, still images, or other information to the other location. Accordingly, both locations may each have a camera and a pointing device that can be controlled remotely or locally. The techniques are also not limited to only two locations, as multiple locations, with cameras and/or pointing devices may be located at one or more of the locations and viewable on a display at one or more of the other locations.

The direction of the light and thus the location of the light on a surface can be controlled by the remote user using a remote-control device. Communications between the remote control device and the pointing device can be transmitted over any type of data transmission channel, including, for example, a wired or wireless network, a dedicated wired or wireless communication link, the Internet, or a cellular telecommunication network. Similarly, images and audio can be transmitted via the same or a different transmission channel. Audio and video communications may be one way or two way. In alternative implementations, the direction of the light and thus the location of the light on a surface can be controlled by the co-located user, who may move the pointer on their own or in response to oral or other directions from the remote user.

The remote-control device (or a local control device) can include a joystick, a touchpad, a touch screen, or any other type of directional control device. In some implementations, for example, the remote user may have a touch screen device (e.g., a smartphone or tablet computer) that runs an application that both displays images and/or video captured by the remote camera and allows the remote user to control the direction of orientation of the remote pointing device and, in some cases, the direction of orientation of the camera.

The direction of the camera may also be able to be controlled independently of the light pointer. Each one may be mounted to a one-, two-, or three-axis gimbal that collectively allow one or more of: rotation to and from a level view, up and down movement, and side to side movement. The camera and the pointing device may be integrated in a singular device or may be mounted in a shared housing, which in either case may further include the necessary electronics for communications, network connections, data processing, data storage, and software control. For example, the camera and the pointing device may be integrated in a smart phone or other mobile device with or without built in wireless or wired communication capability. Alternatively, the pointing device may be a separate unit that connects to and/or works in conjunction with a camera device or a smartphone that includes a camera. For example, the pointing device may clip onto or otherwise attach to a smartphone and may communicate with the smartphone and/or through the smartphone using a local wireless connection (e.g., Bluetooth) or a wired connection.

The remote pointing device can facilitate remote diagnostics in all (or at least many) types of industries. The remote pointing device can supplement the functionality of remote-controlled cameras where users can control the camera from a first location by watching the video taking place at a remote location. From the first location, a user can pan, tilt (in one or more planes), or zoom a camera at the remote location. This functionality allows a person at the first location to instruct a person at the remote location using a pointer that is a visible light beam at the remote location directed by someone at the first location.

In particular, the pointing device allows a user at the first location to point at physical objects at the remote location to give direction to the person at the remote location. Such direction can be used in many different scenarios and contexts. For example, a first user may be an expert diagnostician and the remote user may be a customer or novice. The directed light beam can be used to quickly and conveniently point out a relatively precise or an exact location that the expert intends to reference. Such a capability can avoid confusion that may result from verbal communication difficulties, which may result from language differences, inability to hear clearly, misunderstandings of technical terminology, difficulty in quickly describing an intended location, or other communication issues. It can also help avoid the need for an in person visit or meeting, including time-consuming travel.

Numerous other scenarios can benefit from the capabilities of the pointing device. In a telemedicine context, a remotely located general doctor can use the pointing device to instruct a patient. For example, the doctor can point out where the patient should place diagnostic or testing equipment (e.g., a stethoscope and specifically a digital stethoscope, as a simple example) on the patient's own body for remote assessment. Alternatively, the pointing device could be used to mark a spot on a patient's back, and a measurement in millimeters from the device to the patient's back can be calculated or otherwise determined with a pulse of laser light. A robotic arm that has an attached stethoscope can place the stethoscope against the patient's back to listen to the patient's lungs at a location as directed by a beam of light.

In another example, a remotely located specialist doctor can use the pointing device to instruct a home healthcare nurse to perform activities or testing on the patient. Likewise, an engineer might use the pointing device to instruct or give guidance to an entry level or less experienced or knowledgeable worker on an oil rig, a veterinarian could use the pointing device to instruct a pet owner, a veterinarian could use the device to instruct a feed yard manager, or a mechanic could use the pointing device to instruct a farmer as to how to perform certain maintenance or repair tasks without being physically present. The remote pointing device could also be used in an online learning environment for a teacher to point to specific locations to provide instruction to a student.

In some implementations, multicolored lights or light projectors/lasers can be used to communicate more nuance or specific messages. As an example, red, green, and yellow lights can be used to communicate the universal language of stop, go, or use caution. This type of differential lighting could be combined with, or distinct from, the use of shapes, arrows, etc. In particular, adjustable projectable light shapes can include a circle, square, hexagon, triangle, lines, degree wheel, level and plumb lines, arrows, words, etc. These different shapes and colors could be used to circle objects and help measure things (e.g., bolts, pipes openings, warts/moles, circumference, etc). As an example, the ability to remotely control shapes and colors of the projected light could be used to circle something for a more detailed directive. It could also be used to show the user if something is unlevel or not square, to determine angles, or to determine pipe size, wire size, bolt head size, or bolt nut size. Different types of lights may also be used for pointing at living things (e.g., lights that are not harmful) while lasers may be used for inanimate objects or low power laser used for pointing at a human body with caution to never point at the human eye. Laser light is very helpful to measure distance.

The pointing device may also provide an ability to measure distance by setting two or more points in the three-dimensional physical world. Measurements may be possible using two or more light sources separated by a known distance and detecting angular differences in the orientation of the light sources. The pointing device may also provide an ability to measure a distance from the location of the camera/pointer to a point in the physical world where the light beams meets a physical object. The pointing device may also have changeable digital reticles. For instance, the pointing device could be used to determine longer distances based on the known size of an object (e.g., by calibrating on a soda can or other practical object). When distances are known, it is also possible to determine the size of an object. Distance could also be measured based on a precise GPS location of the remote camera. The light beam could also be used to create directional audio that could be utilized for the blind that may be lost or confused.

A remote user could also direct or aim a laser pointer coupled with an infrared thermometer at a point in the physical world to infer temperature. In another instance the pointer could be used to direct or aim a camera that has thermal imaging capabilities. Either of the instances could be used, for example, to measure temperatures in the physical world to help in a diagnosis. For example, the pointer device could be used to detect the heat at a point as directed by location of the pointer light beam. The camera may also have zoom capabilities that can be controlled by the remote user.

The pointing device may include GPS (e.g., for use in real-time kinematics), a compass, a clip for hanging or other possibilities, a suction cup, a magnetic base, and/or auto level features. The pointing device and/or camera could be built into a helmet, hard hat, headband, scuba mask, face shield, glasses, or vest. In this case, the remote viewer sees exactly what the on-location viewer sees.

A light or laser pointer could also be used to direct remote robotics. A human at a first location could direct a robotic device at a remote location with a mounted camera and a laser pointer that used to direct the robot to a mark defined by the pointing device.

Lights that remain visible when reflecting off any color surface in sunlight can be used.

Multiple pointers can be used to be able to direct things like first and second points. This would be helpful, for example, when a remote user is directing the length of a cut with a plasma cutter at a remote location. The remote user can direct the first and second points as corresponding to the end points of a cut. Another example would be setting the diameter of a circle with two points and then instructing a circle to form of projected lights for ability to define the plasma cut.

The location of a light, laser, or other pointer and the particular objects and surroundings at which the pointer is directed can also be captured using a screenshot function to record or document the location of the pointer (e.g., for audit purposes, liability purposes, or for later review or reference).

The pointer control functionality and user interface can be incorporated into a smartphone app or other software application that has other or additional functionality. Thus, the pointer functionality can supplement the functionality of such an app. In addition, the user interface for controlling the pointer and/or the camera (e.g., direction, whether a pointer laser is currently on or off, zoom, pan, etc.) can be incorporated into an app, which may also include communication related features (e.g., mute, initiate call, etc.).

A system according to the present disclosure may include one or more of the following features. The system may include one or more cameras and one or more substantially co-located light or laser pointers. The pointers may be permanently oriented in a known direction relative to the camera(s), or the orientation of the pointers and cameras may be separately controllable. A one or more axis gimbal with connected actuators may be used to adjust the orientation of each camera and/or light or laser pointer. The cameras and the pointers may be incorporated into a single device, which may also include additional functionality such as voice communications or may be part of separate coordinating devices. Control software for the cameras and pointers may run on a processor locally or at a remote location. The ability to generate different colors and shapes, and for performing other functions described above, may be provided in appropriate components.

A remote device can include a display screen and a remote controller (which may be a touchscreen function of the display screen) to control direction of the cameras and/or pointers. Both the pointing device and the remote device can include communication modules that facilitate two-way communication between the devices. Images or video captured by the camera can be transmitted to the remote device for display on the display screen, and the remote controller can be used to aim the cameras and/or light or laser pointers as desired by a remote user.

In some implementations, to facilitate reproduction of the location of the light pointer, the pointer device may include a sensor that determines the location where a light projected by the light pointer intersects with a surface, or where that point appears on a captured image or video (even if it is not necessarily visible). Software at the pointing device, at the remote device, or in a cloud-based or intermediate server can generate an artificial representation of the light or some other indicator at the appropriate location on the display screen.

In an example implementation, a device or computer program product can control the operation of one or more pointing devices such as a laser pointer or directed light beam at a remote location. The pointing device is associated with a video camera at the same remote location (e.g., to generate a live video feed from the remote location). A pointer control unit (remote control) operated from a first location can include a touch enabled end user component that presents, to the user at the first location, a graphical object representing video from the camera at the remote location. The remote control allows the user at the first location to manipulate the pointers pan, tilt, and direction at the remote location. This remote control can use a touch screen display embedded in the pointer control unit, and the viewing can be enabled by the camera at the location and a touchscreen monitor at the first location.

FIG. 1 depicts an example implementation of a camera/pointer assembly 100. The assembly 100 includes a camera 105, which may be remote controlled or stationary (or may be locally controlled), and an attached pointing device 110 (e.g., a laser pointer), which may be fixed relative to the direction of the camera or may be independently moveable relative to the camera (e.g., to selectively point at different locations within the camera field of view). The pointing device 110 can emit a laser or other light beam of sufficient intensity to serve as a pointer (i.e., the light is visible at least where the light beam intersects with a surface). The camera 105 and the pointing device 110 can be selectively turned on or off by a local or remote user. The assembly 100 includes a base 115 for mounting the assembly on another device or to a fixed surface. A camera gimbal 120 in the base 115 can allow the camera 105 to be repositioned relative to the base 115. The camera gimbal 120 can be manually adjusted or can be mechanized and controllable locally or remotely (e.g., through an app on a remote viewer's device). A pointer gimbal 125 allows the pointing device 110 to be repositioned relative to the camera 105 and can be manually adjusted or can be mechanized and controllable locally or remotely (e.g., through an app on a remote viewer's device). In some implementations, the direction of the camera may be controlled by a local user, while the pointer direction is controlled by a remotely located user.

Figure 2:
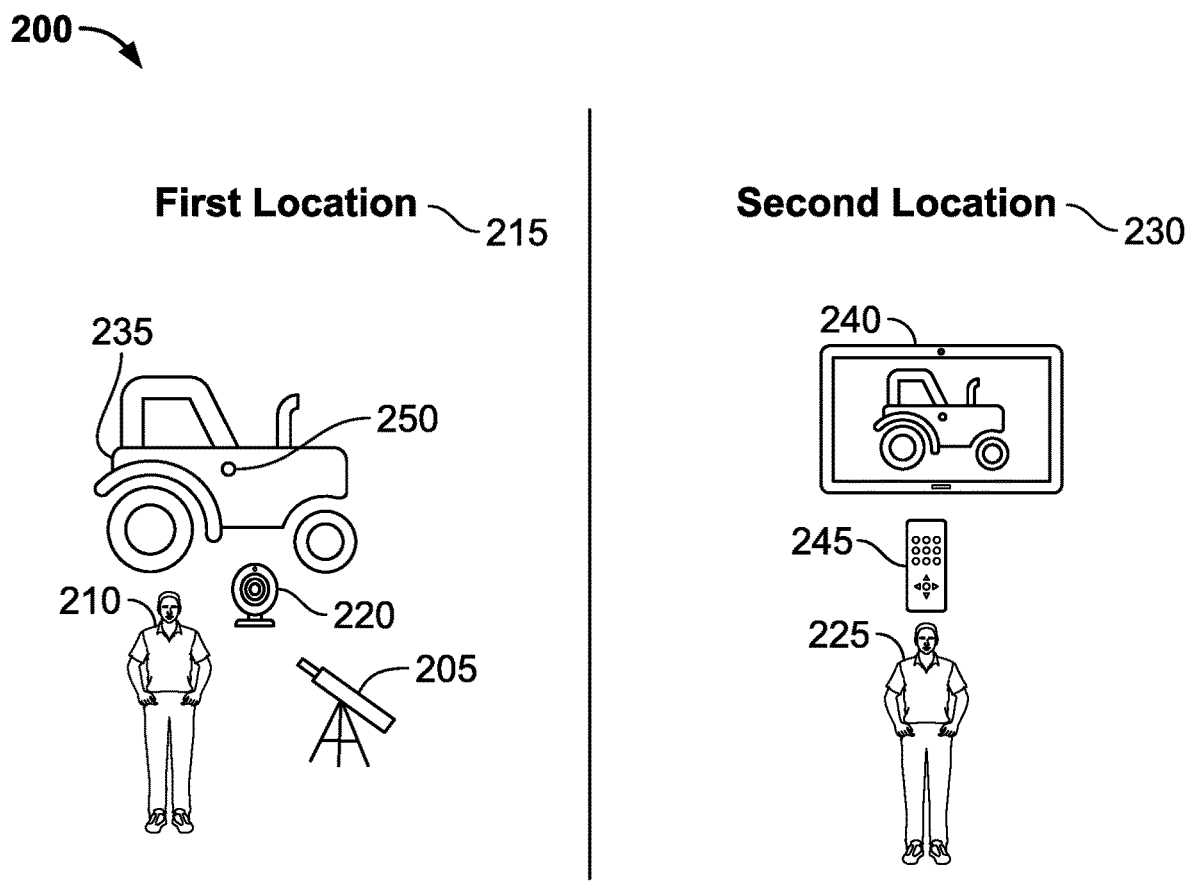
FIG. 2 is an illustrative example of a system for using a remote pointing device.

FIG. 2 is an illustrative example of a system 200 for using a remote pointing device 205. A user 210 (e.g., a farmer) at a first location 215 (e.g., a field or barn) may use the pointing device 205 and a camera 220 to enable an expert 225 (e.g., a mechanic or a diagnostician) at a second location 230, remote from the first location 215, to view an object 235 (e.g., a tractor or a portion thereof) on a display screen 240. The expert 225 at the second location 230 may further use a camera/pointer controller 245 to control a direction in which the camera 220 and/or the pointing device 205 at the first location 215 are directed. The expert 225 at the second location can see the object 235 (through the images or video captured by the camera 220 and transmitted to the second location 230 for display on the screen) and can control the pointing device 205 such that it is directed at a specific location or spot on the object 235 at the first location 215. In this manner, the expert 225 at the second location 230 can show the user 210 at the first location 215 an exact or approximate location 250 without having to attempt to describe the location in words. This can be useful, for example, to show the user 210 at the first location 215 where a part is located, to show where some operation or action needs to be performed, to simply communicate visually, or the like.

Figure 3:
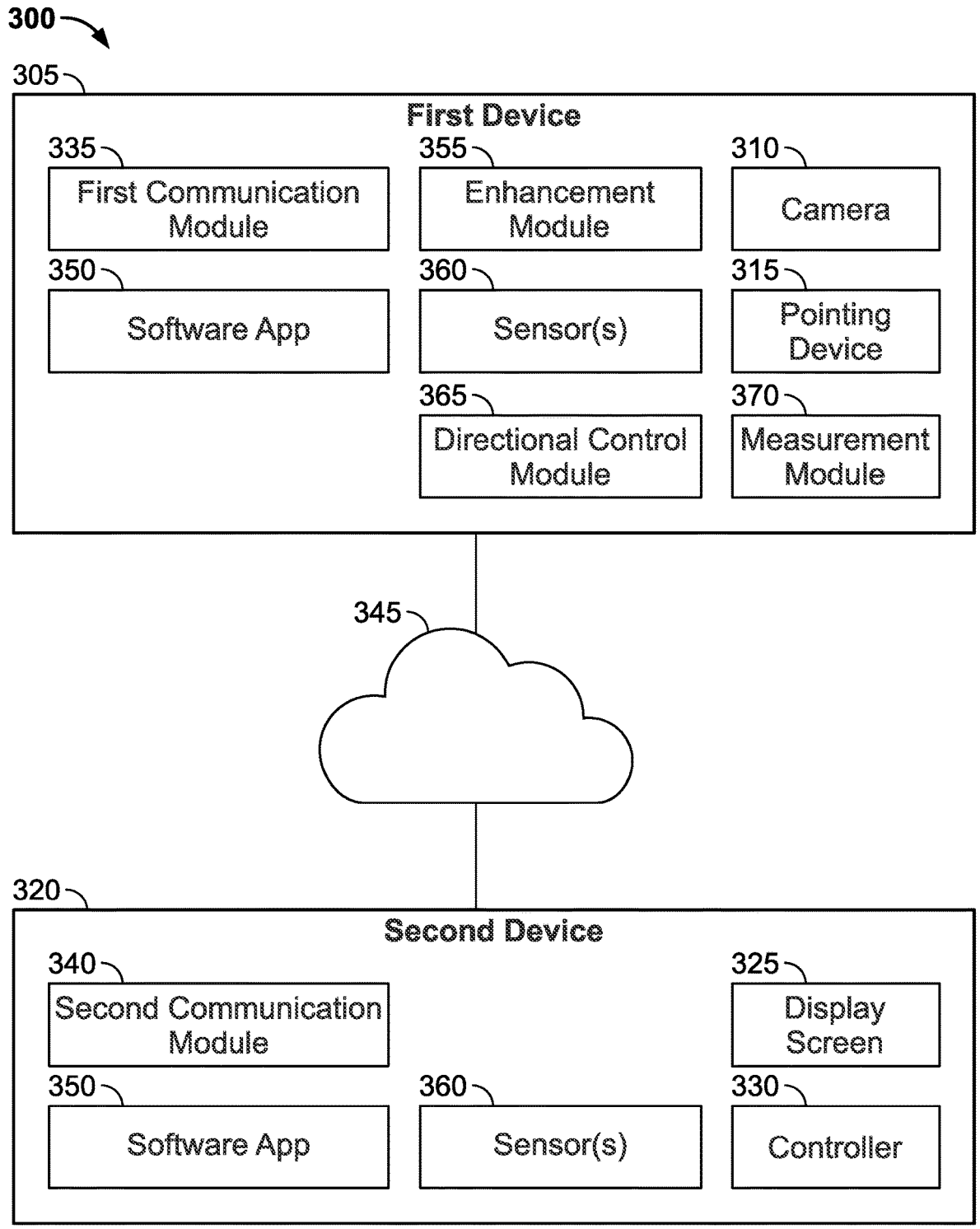
FIG. 3 is a block diagram of a system for remote control of a light beam pointer device.

FIG. 3 is a block diagram of a system 300 for remote control of a light beam pointer device. The system 300 includes a first device 305 at a first location that includes a camera 310 and a light beam pointer device 315. The light beam pointer device 315 generates a light beam that is emitted in a direction within a viewable area of the camera 310. The system 300 also includes a second device 320, located remote from the first device 305, that includes a display screen 325 adapted to receive and display images captured by the camera and a controller 330 adapted to control pointing of the light beam pointer device 315 in a direction selected by a user of the second device. In some implementations, the first device 305 and/or the second device 320 can be implemented as part of a smartphone or tablet computer or can be implemented as devices 305 and 320 that communicate with each other via smartphones. In some implementations, the components of the first device 305 and/or the second device 320 can be distributed across multiple cooperating devices. For example, some functions of the first device can be performed by a camera and pointing device while other functions are performed by a smartphone in communication with the camera and pointing device.

The first device 305 includes a first communication module 335 and the second device 320 includes a second communication module 340. The first communication module 335 and the second communication module 340 are each adapted to enable transmitting the images captured by the camera 310 from the first communication module 335 to the second communication module 340 for display on the display screen 325. Transmissions can be sent via a network 345, which may include a cellular network, Internet, wifi network, other wired or wireless communication networks, or a combination of these. The first communication module 335 can be used to transmit data to, and/or receive data from, the second communication module 340. The second communication module 340 can be used to transmit data to, and/or receive data from, the first communication module 335. Data communicated in each or both directions, as appropriate, can include control data from the controller 330 (e.g., sent from the second communication module 340 to the first communication module 335), images or video captured by the camera 310 and sent for display on the display screen 325, images or video captured at the second device 320 and sent to the first device 305, one or two way audio communications of audio captured by a microphone, other control data, enhancements to the images or video (e.g., computer-generated overlays on the images or video), measurement data (e.g., distances detected from images and/or laser measurements), or other types of data.

In some implementations, the first device 305 and the second device 320 can each be implemented as part of a smart phone or tablet computer or can be in communication with a smart phone or other wired or wireless communication device. Smartphones, for example, may provide the underlying data communication functionality between the first device 305 and the second device 320. In one example implementation, the first communication module of the first device 305 can support Bluetooth, WiFi, or other local communication with a smartphone, through which communications with the second device 320 are conducted. The second device 320 can, on the other hand, be a smartphone. The smartphones can include a software app 350 that provides a user interface for operation and control of the system 300. The software app 350 on either device 305 or 320 can, for example, provide a user interface for controlling the camera 310 and/or the pointer device 315 (e.g., with respect to adjusting directional orientation, zooming, turning video capture on or off, capturing a still image, granting access to the other device 305 or 320, turning on or off the pointer device 315, adjusting brightness of the light source, and the like). The software app 350 can also provide other controls, such as enabling projection of shapes, measuring between points, and enhancing the video or images with representations of the projected light.

The camera 310 and/or the pointer device 315 can be mounted on a fixed mount or on a mechanized or otherwise controllably moveable mount 355. The first device 305 and/or the second device 315 can adjust the orientation of the camera 310 and/or pointer device 315 using controls in the software app 350. Motors in the mount 355 can be actuated to adjust the orientation of the camera 310 and/or pointer 315.

The system 300 can include various software or hardware modules, which, although depicted in certain locations in FIG. 3, may be included in the first device 305, the second device 320, or in a cloud-based or centralized server 350. An enhancement module 355 can generate a representation of a projection of the light beam on a surface for display on the display screen 325. Such a representation may be used so that the location of the light beam is visible (or more visible) in video or still images to a remote user. The location of the representation can be determined as a specified location within the field of view of the camera 310 based on the orientation of the camera 310 (e.g., when the orientation of the pointer device 315 is fixed relative to the orientation of the camera 310). Alternatively, one or more sensors 360 can detect the location where the light beam projects onto a surface. For example, a sensor 360 can detect where the light intersects with a surface or can detect an orientation of the pointer device 315 relative to the camera 310 field of view and the enhancement module can calculate where the light beam is projecting. Other techniques for determining or estimating the location of the light beam can also be used. The enhancement module 355 can also be used in combination with a pointer device 315 capable of generating light beams that project different shapes (e.g., an arrow, a circle, a box, etc.) onto a surface to control the shape being projected. The different shapes may be generated using a plurality of individual light sources that can be independently oriented, using a filter or refractor that creates a desired shape, or using different light sources that project different shapes.

A directional control module 365 can, responsive to instructions from the software app 350 on either the first device 305 or the second device 315, control the mount 355 to adjust the orientation of the camera 310 or pointer device 315. A measurement module 370 can be used to calculate distance between the camera 310 and a surface (e.g., using a laser measurement sensor 360) or to calculate a distance between two points in the field of view of the camera (e.g., by calculating the distance for two surfaces using laser distance measurements and a differential angular orientation between a laser pointed at each of the measured surfaces).

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions tangibly stored on a computer readable storage device for execution by, or to control the operation of, data processing apparatus. In addition, the one or more computer program products can be tangibly encoded in a propagated signal, which is an artificially generated signal, e.g., a machine-generated electrical, optical, or electromagnetic signal, that is generated to encode information for transmission to suitable receiver apparatus for execution by a computer. The computer readable storage device can be a machine-readable storage device, a machine-readable storage substrate, a memory device, or a combination of one or more of them.

A computer program (also known as a program, software, software application, script, or code) can be written in any form of programming language, including compiled or interpreted languages, declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data (both input and output). Generally, a computer will also include, or be operatively coupled to receive data from or transfer data to, or both, one or more mass storage devices for storing data, e.g., magnetic, magneto optical disks, solid-state, or optical disks. However, a computer need not have such devices. Moreover, a computer can be embedded in another device, e.g., a mobile telephone, mobile device, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CDROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the subject matter described in this specification can be implemented in a computing system that includes a backend component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such backend, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other.

While this specification contains many implementation details, these should not be construed as limitations on the scope of the invention or of what may be claimed, but rather as descriptions of features specific to particular implementations of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations may be described in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the invention have been described. Other implementations are within the scope of the description. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system comprising:
   a camera adapted to capture at least one image at a first location associated with a user of the camera;
   a light source adapted to generate a narrow beam of light in a direction within a viewable area of the camera;
   a display screen at a second location, remote from the first location, adapted to display images captured by the camera; and
   a controller, associated with the display screen, adapted to facilitate pointing of the light source toward a specific location on a selected object at the first location in an immediate vicinity of the camera, wherein the narrow beam of light is adapted to allow a user of the controller to communicate, to the user of the camera, the specific location on the selected object where a task is to be performed by the user of the camera.

2. The system of claim 1 further comprising:
   a first communication module at the first location; and
   a second communication module at the second location, wherein the first communication module and the second communication module are adapted to enable at least one of:
     transmitting the images captured at the first location from the first communication module to the second communication module for display on the display screen; or
     transmitting control data received from the controller from the second communication module to the first communication module.

3. The system of claim 1 wherein the first communication module and the second communication module are adapted to enable:
   transmitting the images captured at the first location from the first communication module to the second communication module for display on the display screen; and
   transmitting control data received from the controller from the second communication module to the first communication module.

4. The system of claim 3 wherein the first communication module and the second communication module are further adapted to enable audio communications between the first location and the second location.

5. The system of claim 1 further comprising software adapted to generate an artificial representation of a projection of the narrow beam of light on a surface for display on the display screen.

6. The system of claim 1 wherein the light source is attached to the camera and emits the narrow beam of light in a fixed direction relative to a field of view of the camera.

7. The system of claim 1 wherein the light source is attached to the camera and emits the narrow beam of light in a controllable direction relative to a field of view of the camera in response to instructions from the controller.

8. The system of claim 1 wherein the light source is adapted to selectively generate a plurality of narrow beams of light each projecting a different geometric shape.

9. The system of claim 1 wherein the light source is adapted to generate a first narrow beam of light and a second narrow beam of light, further comprising a sensor adapted to determine a distance between a projection of the first narrow beam of light on a surface and a projection of the second narrow beam of light on the surface.

10. The system of claim 1 further comprising wearable apparel that include the camera and the light source.

11. The system of claim 1 further comprising a sensor adapted to detect a location of a projection of the narrow beam of light on a surface.

12. The system of claim 11 further comprising software adapted to generate an artificial representation of the projection of the narrow beam of light on a surface at the detected location for display on the display screen.

13. An apparatus, comprising:
    a light source adapted to generate a narrow beam of light in a direction within a field of view of a camera;
    a communication module adapted to receive control data from a remote controller; and
    a gimbal adapted to reposition the light source to project the narrow beam of light at a specific selected location on an object in an immediate vicinity of the light source, wherein the specific selected location is identified based on video transmitted to and displayed on a display screen collocated with the remote controller in response to the control data received from the remote controller, and wherein the narrow beam of light is adapted to allow a user of the remote controller to communicate, to a user of the apparatus, the specific selected location on the object where a task is to be performed by the user of the apparatus.

14. The apparatus of claim 13 further comprising the camera.

15. The apparatus of claim 14 further comprising software adapted to generate a representation of the narrow beam of light projected on the selected location for inclusion in the video.

16. A computer storage medium encoded with a computer program, the program comprising instructions that when executed by data processing apparatus cause the data processing apparatus to perform operations comprising:
    transmitting at least one image captured by a camera at a location associated with a first user located in a vicinity of the camera to a remote device at a remote location for display on the remote device associated with a second user at the remote location;
    controlling a light source to generate a narrow beam of light in a selected direction within a viewable area of the camera;
    receiving control data generated by the remote device based on a selection of a specific location on a display screen adapted to display images captured by the camera on the remote device; and
    controlling a direction of the narrow beam of light based on the control data, wherein the narrow beam of light is adapted to allow the second user to communicate, to the first user, a specific location on a selected object in an immediate vicinity of the camera where a task is to be performed by the user of the apparatus.

17. The computer storage medium of claim 16, wherein the program further comprises instructions that when executed by data processing apparatus cause the data processing apparatus to perform operations comprising transmitting audio captured by a microphone to the remote device.

18. The computer storage medium of claim 16, wherein the program further comprises instructions that when executed by data processing apparatus cause the data processing apparatus to perform operations comprising selectively enabling the remote device to control the direction of the narrow beam of light in response to commands received from the first user.

19. The computer storage medium of claim 16, wherein the program further comprises instructions that when executed by data processing apparatus cause the data processing apparatus to perform operations comprising:
  receiving data indicating a location where the narrow beam of light is projected; and
  generating, on the display screen, an artificial representation of the narrow beam of light projected on the indicated location in transmitted images.

20. The computer storage medium of claim 16, wherein the program further comprises instructions that when executed by data processing apparatus cause the data processing apparatus to perform operations comprising processing the received data to identify the indicated location.

\* \* \* \* \*